Aug. 2, 1966       J. E. BEGGS       3,264,512
HIGH VACUUM THERMIONIC CONVERTER
Original Filed Nov. 3, 1958
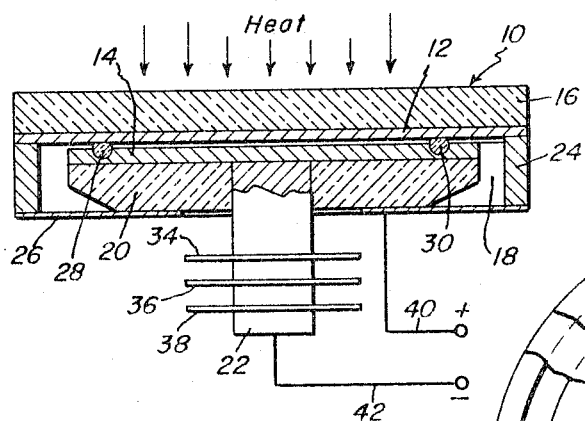
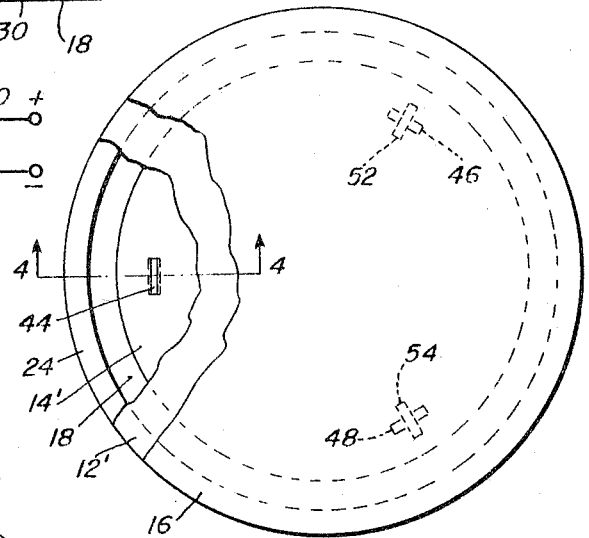
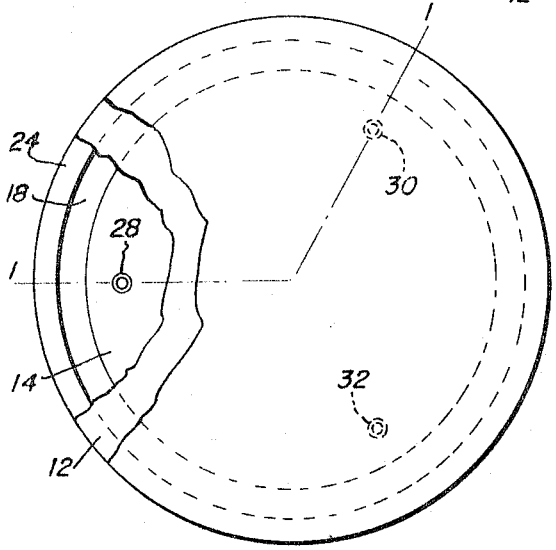
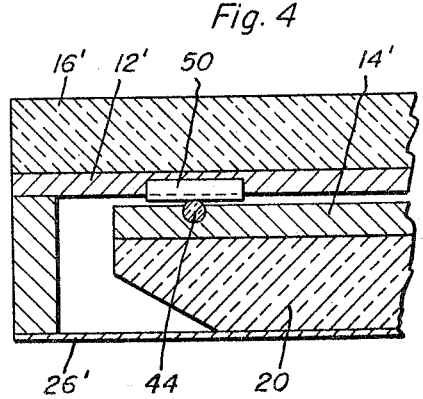
Inventor:
James E. Beggs,
by Richard R. Brainard
His Attorney.

United States Patent Office 3,264,512
Patented August 2, 1966

---

3,264,512
HIGH VACUUM THERMIONIC CONVERTER
James E. Beggs, Schenectady, N.Y., assignor to General Electric Company, a corporation of New York
Original application Nov. 3, 1958, Ser. No. 771,515, now Patent No. 3,176,164, dated Mar. 30, 1965. Divided and this application Dec. 19, 1963, Ser. No. 331,693
6 Claims. (Cl. 313—250)

This application is a division of my copending application Serial No. 771,515, filed November 3, 1958, now Patent No. 3,176,164, and assigned to the assignee of this application.

This invention relates to a thermionic converter of the type having an electron emissive cathode and a spaced, electron collecting anode enclosed in an evacuated chamber and being responsive to heat applied to the cathode to produce an electron current flow from the cathode to the anode.

In thermionic converters of the aforementioned type, two factors adversely affecting efficiency and good performance thereof are the space charge effect and high heat transfer between cathode and anode. The space charge effect is a result of an accumulation of electrons in the interelectrode space between cathode and anode and the composite negative charge of such an accumulation of electrons has a repelling or retarding influence on electrons newly emitted from the cathode since these newly emitted electrons are also negatively charged. Accordingly, the retarding influence on the newly emitted electrons decreases the current flow between electrodes and decreases the efficiency of the converter. Input heat energy is supplied to the cathode to produce electron emission and high heat transfer from cathode to anode represents a loss since it decreases the energy available to produce electron emission and further has the undesirable tendency of transferring sufficient energy to the anode to increase the electron emission from the anode whereby the net number of electrons traveling from cathode to anode is reduced and the efficiency of the converter is also reduced.

Accordingly, it is a primary object of this invention to avoid or minimize the adverse effect in a thermionic converter of space charge in the interelectrode region and to minimize the transfer of heat from the cathode to the anode thereof thereby improving the performance and increasing the operating efficiency thereof.

Pursuant to the aforementioned object and in accordance with my invention, space charge in a thermionic converter having a heated cathode and a spaced anode preferably operable at a considerably lower temperature, is minimized by structural features facilitating a very small clearance between cathode and anode whereby the electrons that would otherwise form a space charge are collected by the anode and excessive heat transfer from the cathode to the anode is minimized by further structural features imposing a long path of high impedance to the heat flowing between the electrodes by conduction. The construction is made so that radiative and conductive transfer of heat to the anode is insufficient to excessively heat the anode and thus, an effective limitation on excessive heat transfer is achieved.

Other and further objects and advantages will appear from a perusal of the following detailed description of the invention considered with the accompanying drawings in which:

FIG. 1 is an elevational view in cross-section of a thermionic converter according to one embodiment of my invention;

FIG. 2 is a plan view of the thermionic converter shown in FIG. 1 partially cut away, showing particularly the relative position of the spacing supports between electrodes;

FIG. 3 is a plan view partially cut away of a thermionic converter according to another embodiment of my invention and particularly showing the relative positioning of space supports between electrodes; and FIG. 4 is a partial view in elevation showing the details of the spacer supports shown in FIG. 3.

Referring now to FIG. 1 of the drawing, 10 represents generally the entire thermionic converter of one embodiment of the invention and includes as principal elements thereof, a cathode electrode 12 preferably of nickel, titanium, or tungsten and coated with an electron emission enhancing material such as BaSrO facilitaing copius electron emission at appropriate temperatures and a closely spaced anode electrode 14 preferably of platinum, molybdenum or nickel also having a thin coating of BaSrO for collecting the electron emitted by the cathode. Each of these electrodes is shown circular in shape as represented in FIG. 2, with the cathode electrode being somewhat larger than the anode electrode and each is of substantially uniform thickness with planar sides to establish the spacing between all parts of the electrodes substantially uniform. However, in a practical embodiment of the invention wherein a large plurality of converters are aggregated to produce a larger power output, it is to be understood that space may be more effectively utilized by making the converter and each of its electrodes polygonal in shape so that the sides thereof may interfit with each other and leave no idle space therebetween as would occur in the case of circular electrodes.

For elevating cathode electrode 12 to a temperature of emissivity, heat may be transferred thereto through an insulating, refractory element 16 preferably of some suitable ceramic such as alumina, and attached to the cathode as by brazing. A source of heat is indicated by the arrows in the drawing and may be derived from a flame, solar radiation, a nuclear reaction or any other source.

Anode electrode 14 is secured as by brazing to an annular insulating refractory member 20 of alumina or other suitable material and to an anode cooling post 22 described in more detail hereinbelow. For supporting anode 14 in position relative to cathode 12, a chamber 18, which may be evacuated or filled with a low pressure gaseous vapor of cesium or potassium or the like is established by a continuous ring 24 preferably of titanium secured at one end to an outer peripheral portion of cathode 12 and at the other end to an outer peripheral portion of an annular, foil disk 26 which is secured at its inner diameter to insulating, refractory ceramic member 20. Accordingly, atmospheric pressure applied to opposite sides of the converter is effective to urge the electrodes together since the foil member 26 is thin and flexible to allow such movement.

In accordance with a feature of this embodiment of my invention, a predetermined and close spacing between electrodes is accurately maintained, however, by a plurality of non-conductive sapphire members as shown at 28, 30 and 32, pressed into sockets preferably in the anode electrode to a depth leaving the members exposed to equal heights within a range of substantially .0001 inch to .001 inch. The members 28, 30 and 32 are preferably spheroidal in shape, being generally round but somewhat flattened at the areas of contact with the cathode. With this shape the heat transfer between members is maintained at a low value but the force urging the electrodes together is spread over the area of the flattened portions of the sapphire members. This area is large relative to the area of a point contact that would be presented by a substantially perfect sphere and thus the stresses on the sapphire members may be maintained low enough to prevent destruction thereof. Accordingly, the members engage the cathode electrode and the cathode and anode are prevented from direct contact. The force of ambient, atmospheric pressure maintains the contact between the sapphire members and each of the electrodes without the necessity of other biasing means. A fine adjustment for obtaining a uniform spacing between electrodes is obtainable by use of a thin metal foil to gauge the depth to which the spheres are pressed.

In accordance with the foregoing, it is observed that a minute spacing between the cathode and anode may be established and that the heat transfer from cathode to anode is achieved by radiation and conduction through the members 28, 30 and 32 and conduction through foil 26. The members 28, 30 and 32 are of very small cross-section and are good insulators and the path through foil 26 is long and of small cross-section. Additionally, the foil is preferably of a material of low conductivity. Accordingly, a minimum of heat is transferred to the anode by the different paths of conduction.

As a further provision for maintaining anode 14 at a desirable temperature of operation, any excess heat received thereby is dissipated by radiating fins 34, 36 and 38 attached for good conduction to anode cooling post 22.

In operating the thermionic converter 10, the cathode may be heated to a temperature within the range from 700° C. to 1200° C. at which it exhibits a work function of approximately 1.6 to 2.6 electron volts while the anode is maintained at approximately 400° C. or less at which it exhibits a work function of approximately 1.4 to 1.1 electron volts. Thus, an output voltage appears across output leads 40 and 42 connected respectively to the cathode and anode circuits at relatively cool portions thereof and this output voltage is approximately equal to the difference between these work functions or approximately .5 to 1.5 volts for low output. For maximum power output at leads 40 and 42, a potential of approximately .25 to .75 volt may appear across these leads.

In accordance with another embodiment of the invention similar to that shown in FIGS. 1 and 2 and as shown in FIGS. 3 and 4 of the drawing, the spacing between electrodes may be established and maintained by sets of sapphire cylinders pressed into respective electrodes to a predetermined depth and aligned to engage the cylinders in the other electrode. A portion of each cylinder protrudes above the surface of the electrode whereby the combined protrusions of opposed cylinders determines the spacing between the electrodes. Thus, cylinders 44, 46, and 48 are pressed into the anode electrode 14′ and these cylinders, as shown more clearly with respect to cylinders 44 at the cut-away portion of cathode electrode 12′, are positioned to extend generally circumferentially at vertices of an equilateral triangle. The cathode electrode 12 is provided with corresponding sapphire cylinders 50, 52 and 54 pressed into the cathode and extending in generally radial directions at vertices of an equilateral triangle. As shown more clearly in FIG. 4 of the drawings with respect to cylinders 44 and 50, the cylinders of pairs 44 and 50, 46 and 52 and 48 and 54, are in crosswise engagement with each other and each cylinder protrudes above the surface of the electrode into which it is pressed to establish the spacing between the electrodes. The crosswise engagement enables considerable angular movement of the electrodes relative to each other while maintaining a stable spacing arrangement. According to a satisfactory structure of this embodiment of invention, the cylinders each protrude substantially .0001 inch whereby the interelectrode spacing is maintained at .0002 inch. In other respects, the embodiment of invention shown in FIGS. 3 and 4 is substantially the same as that shown in FIGS. 1 and 2 and accordingly, similar parts are designated with the same numerals primed.

Having thus described this invention in such full, clear, concise and exact terms as to enable any person skilled in the art to which it pertains, to make and use the same and having set forth the best mode contemplated of carrying out this invention, I state that the subject matter which I regard as being my invention is particularly pointed out and distinctly claimed in what is claimed, it being understood that equivalents or modifications of or substitutions for parts of the above specifically described embodiment of this invention may be made without departing from the scope of the invention as set forth in what is claimed.

What I claim as new and desire to secure by Letters Patent of the United States is:

1. A thermionic converter for converting heat energy to electrical energy comprising an electron emissive cathode electrode responsive to heat to emit electrons, an electron collecting anode electrode spaced from said cathode electrode, means including a plurality of circular cylindrical spacers for insulating and maintaining the spacing between said electrodes and being embedded in respective electrodes with convex surfaces thereof protruding above the surfaces of the electrodes and being in crossed contact with each other.

2. A thermionic converter for converting heat energy to electrical energy comprising a thermionically emissive cathode electrode and a spaced anode electrode, each of said electrodes having an extended planar surface means for maintaining the spacing between said electrodes including a plurality of cylindrical insulators embedded in one of said electrodes and protruding above the surface thereof and having their axes extending generally parallel to the planar surface thereof, a like plurality of insulators embedded in the other of said electrodes and having their axes extending generally parallel to the planar surface thereof and orthogonal to the axes of the insulators in said one electrode and protruding above the surface thereof into crossed engagement with the insulators embedded in said one electrode.

3. A thermionic converter for converting heat energy to electrical energy comprising a thermionically emissive cathode electrode and a spaced anode electrode, means for maintaining the spacing between said electrodes including a plurality of cylindrical insulators embedded in one of said electrodes, each insulator being tangent to a circle on one of said electrodes and protruding above the surface thereof, a like plurality of cylindrical insulators embedded in the other of said electrodes and each extending along a portion of the radius of a circle on said other electrode and being in crossed engagement with the cylinders embedded in said one electrode.

4. A thermionic converter for converting heat energy to electrical energy comprising a planar electron emissive cathode electrode responsive to heat to emit electrons, a planar electron collecting anode electrode spaced from said cathode electrode, means interposed between said electrodes to provide a predetermined minimum spacing therebetween, and means supporting said cathode electrode with respect to said anode electrode and including a rigid member secured to said cathode electrode, a thin, flexible disk member of low heat conducting capacity secured to said rigid member and extending beyond the periphery of said planar cathode electrode, said disk member being secured to means rigid with said anode electrode, said thin flexible member forming a portion of an enclosing wall of said converter, the space between said electrodes being evacuated whereby ambient pressure is effective to distort said flexible member and to move said anode electrode toward said cathode electrode to maintain said predetermined minimum spacing.

5. A thermionic converter for converting heat energy into electrical energy comprising an electron emissive cathode electrode and a spaced, electron collector electrode, means enclosing said electrodes and including a member disposed in the heat conducting path between said electrodes and having one side exposed to ambient space, said member being relatively thin and being of a material presenting a relatively high resistance to heat flow and means mechanically interposed between said electrodes and determining the minimum spacing between said electrodes.

6. A thermionic converter device for converting heat energy into electrical energy comprising a relatively rigid planar electron emitting electrode and an opposed planar collector electrode and envelope means joined to said electrodes and forming an enclosure for said device, a portion of the wall of said envelope means mechanically interconnecting said emitting electrode and said collector electrode being of thin relatively flexible metal of low heat transfer capacity to permit movement of said electrodes relative to one another and to minimize the heat transfer between said electrodes and spacer means mechanically interposed between said opposed electrodes to provide a predetermined minimum spacing between said electrodes.

References Cited by the Examiner
UNITED STATES PATENTS

| | | | |
|---|---|---|---|
| 2,389,935 | 11/1945 | Rothstein | 313—148 |
| 2,699,517 | 1/1955 | Diemer | 313—250 |
| 2,916,649 | 12/1959 | Levin | 313—268 X |
| 3,056,912 | 10/1962 | Forman. | |

JOHN W. HUCKERT, *Primary Examiner.*

DAVID J. GALVIN, *Examiner.*

A. J. JAMES, *Assistant Examiner.*